United States Patent
Nakai

(10) Patent No.: US 11,136,418 B2
(45) Date of Patent: Oct. 5, 2021

(54) METHOD FOR MANUFACTURING HYDROGENATED NITRILE RUBBER

(71) Applicant: ZEON CORPORATION, Tokyo (JP)

(72) Inventor: Akito Nakai, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 43 days.

(21) Appl. No.: 16/758,691

(22) PCT Filed: Nov. 2, 2018

(86) PCT No.: PCT/JP2018/040895
§ 371 (c)(1),
(2) Date: Apr. 23, 2020

(87) PCT Pub. No.: WO2019/093248
PCT Pub. Date: May 16, 2019

(65) Prior Publication Data
US 2021/0179740 A1 Jun. 17, 2021

(30) Foreign Application Priority Data

Nov. 10, 2017 (JP) .............................. JP2017-217183

(51) Int. Cl.
*C08C 19/02* (2006.01)
*C08F 8/04* (2006.01)
*C08F 6/22* (2006.01)
*C08C 1/15* (2006.01)

(52) U.S. Cl.
CPC ................ *C08C 19/02* (2013.01); *C08C 1/15* (2013.01); *C08F 6/22* (2013.01); *C08F 8/04* (2013.01)

(58) Field of Classification Search
CPC ... C08C 19/02; C08C 1/15; C08F 6/22; C08F 8/04
See application file for complete search history.

(56) References Cited

U.S. PATENT DOCUMENTS

| 5,651,995 | A | * | 7/1997 | Oyama | C08C 19/02 524/565 |
| 8,404,767 | B2 | * | 3/2013 | Hosotani | C08K 5/098 524/399 |
| 2017/0101495 | A1 | * | 4/2017 | Kapur | C08F 210/16 |

FOREIGN PATENT DOCUMENTS

JP 2017-504696 A 2/2017

OTHER PUBLICATIONS

Feb. 5, 2019 International Search Report issued in International Patent Application No. PCT/JP2018/040895.

* cited by examiner

*Primary Examiner* — Robert D Harlan
(74) *Attorney, Agent, or Firm* — Oliff PLC

(57) ABSTRACT

A method produces a hydrogenated nitrile rubber having an iodine value of 120 or less, the method having a first coagulation step of adding a halogen atom-free metal salt as a coagulant to a nitrile rubber latex to form a nitrile rubber coagulum; a solution preparation step of dissolving the nitrile rubber coagulum in an organic solvent to prepare a nitrile rubber solution; a hydrogenation step of subjecting the nitrile rubber solution to a hydrogenation reaction to afford a hydrogenated nitrile rubber solution; and a second coagulation step of adding a divalent metal salt as a coagulant to the hydrogenated nitrile rubber solution to form a hydrogenated nitrile rubber coagulum.

10 Claims, No Drawings

METHOD FOR MANUFACTURING HYDROGENATED NITRILE RUBBER

TECHNICAL FIELD

The present invention relates to a method for producing a hydrogenated nitrile rubber, and more specifically relates to a method for efficiently producing a hydrogenated nitrile rubber which can provide a cross-linked rubber having high tensile strength and elongation, excellent heat oil resistance, and excellent adhesion to metals.

BACKGROUND ART

Nitrile rubber (acrylonitrile butadiene copolymer rubber), because of its advantageous properties such as oil resistance, mechanical properties, and chemical resistance, has conventionally been used as a material for automotive rubber parts such as hoses and tubes. Hydrogenated nitrile rubber (hydrogenated acrylonitrile-butadiene copolymer rubber) obtained by hydrogenation of carbon-carbon double bonds in the polymer main chain of nitrile rubber has further enhanced heat resistance, which enables its use in rubber parts such as belts, hoses, and diaphragms.

For example, Patent Document 1 discloses a technique where by adding a specific substituted phenol in an amount of 0.01 wt % to less than 0.45 wt % to a hydrogenated nitrile rubber, the storage stability of the hydrogenated nitrile rubber is improved. In Patent Document 1, a hydrogenated nitrile rubber is produced through the following steps: preparing a nitrile rubber latex by emulsion polymerization; adding sodium chloride or magnesium chloride as a coagulant to the prepared nitrile rubber latex to cause coagulation, thereby affording a solid nitrile rubber; dissolving the obtained solid nitrile rubber in an organic solution to prepare a nitrile rubber solution; subjecting the prepared nitrile rubber solution to a hydrogenation reaction to afford a hydrogenated nitrile rubber solution; and then adding a water-soluble polymer or calcium chloride as a coagulant to the prepared hydrogenated nitrile rubber solution to afford a hydrogenated nitrile rubber.

Unfortunately, the technique of Patent Document 1 results in a hydrogenated nitrile rubber which exhibits unsatisfactory resistance to repetition of immersion in an oil and subsequent heat aging, that is, unsatisfactory heat oil resistance, which indicates that the rubber cannot be used in applications where it is used at high temperature in contact with an oil and therefore heat oil resistance is required. Especially in recent years, there have been demands for higher levels of heat resistance and oil resistance for applications such as belts and seals for automobiles which are used at high temperature in contact with oils, and demands for excellent resistance to repetition of immersion in an oil and subsequent heat aging, that is, excellent heat oil resistance.

RELATED ART DOCUMENTS

Patent Documents

Patent Document 1: Japanese Patent Publication No. 2017-504696

SUMMARY OF THE INVENTION

Problem to be Solved by the Invention

The present invention has been made in consideration of the current circumstances, and the purpose of the present invention is to provide a method for efficiently producing a hydrogenated nitrile rubber which can provide a cross-linked rubber having high tensile strength and elongation, excellent heat oil resistance (resistance to repetition of immersion in an oil and subsequent heat aging), and excellent adhesion to metals.

Means for Solving Problems

As a result of intensive studies to achieve the above purpose, the present inventors have found that the purpose can be achieved by a method for producing a hydrogenated nitrile rubber including coagulating a nitrile rubber latex, preparing a nitrile rubber solution by dissolving the rubber in an organic solvent, and hydrogenating the rubber in the form of the nitrile rubber solution, the coagulating a nitrile rubber latex including using a halogen atom-free metal salt as a coagulant, the method further including using a divalent metal salt as a coagulant after the hydrogenation reaction to coagulate the hydrogenated nitrile rubber solution. This finding has led to the completion of the present invention.

Specifically, the present invention provides a method for producing a hydrogenated nitrile rubber having an iodine value of 120 or less, the method comprising:

a first coagulation step of adding a halogen atom-free metal salt as a coagulant to a nitrile rubber latex to form a nitrile rubber coagulum;

a solution preparation step of dissolving the nitrile rubber coagulum in an organic solvent to prepare a nitrile rubber solution;

a hydrogenation step of subjecting the nitrile rubber solution to a hydrogenation reaction to afford a hydrogenated nitrile rubber solution; and a second coagulation step of adding a divalent metal salt as a coagulant to the hydrogenated nitrile rubber solution to form a hydrogenated nitrile rubber coagulum.

In the method for producing a hydrogenated nitrile rubber according to the present invention, the halogen atom-free metal salt is preferably a metal sulfate, more preferably magnesium sulfate or aluminum sulfate.

In the method for producing a hydrogenated nitrile rubber according to the present invention, the divalent metal salt is preferably a divalent metal chloride, more preferably calcium chloride or magnesium chloride.

In the method for producing a hydrogenated nitrile rubber according to the present invention, the amount of the halogen atom-free metal salt used in the first coagulation step is preferably 0.5 to 20 parts by weight relative to 100 parts by weight of the nitrile rubber component in the nitrile rubber latex, and the amount of the divalent metal salt used in the second coagulation step is preferably 0.01 to 0.5 parts by weight relative to 100 parts by weight of the hydrogenated nitrile rubber component in the hydrogenated nitrile rubber solution.

In the method for producing a hydrogenated nitrile rubber according to the present invention, the first coagulation step preferably includes adding the nitrile rubber latex to an aqueous solution of the halogen atom-free metal salt, and stirring the resulting mixture to cause coagulation.

In the method for producing a hydrogenated nitrile rubber according to the present invention, the second coagulation step preferably includes adding the hydrogenated nitrile rubber solution to an aqueous solution of the divalent metal salt, and stirring the resulting mixture to cause coagulation.

The present invention also provides a method for producing a cross-linkable rubber composition, comprising the step of adding a cross-linking agent to a hydrogenated nitrile rubber produced by the above production method.

The present invention further provides a method for producing a cross-linked rubber, comprising the step of cross-linking a cross-linkable rubber composition produced by the above production method.

Effects Of Invention

The present invention enables efficient production of a hydrogenated nitrile rubber which can provide a cross-linked rubber having high tensile strength and elongation, excellent heat oil resistance, and excellent adhesion to metals.

DESCRIPTION OF EMBODIMENTS

The method for producing a hydrogenated nitrile rubber according to the present invention is a method for producing a hydrogenated nitrile rubber having an iodine value of 120 or less, the method comprising:

a first coagulation step of adding a halogen atom-free metal salt as a coagulant to a nitrile rubber latex to form a nitrile rubber coagulum;

a solution preparation step of dissolving the nitrile rubber coagulum in an organic solvent to prepare a nitrile rubber solution;

a hydrogenation step of subjecting the nitrile rubber solution to a hydrogenation reaction to afford a hydrogenated nitrile rubber solution; and a second coagulation step of adding a divalent metal salt as a coagulant to the hydrogenated nitrile rubber solution to form a hydrogenated nitrile rubber coagulum.

<First Coagulation Step>

The first coagulation step in the production method according to the present invention is a step of adding a halogen atom-free metal salt as a coagulant to a nitrile rubber latex to form a nitrile rubber coagulum.

Examples of the nitrile rubber latex used in the present invention include, but are not limited to, those obtainable by emulsion polymerization of monomer mixtures containing an α,β-ethylenically unsaturated nitrile monomer and a diene monomer and optionally containing other monomers copolymerizable with these monomers; and the like.

The α,β-ethylenically unsaturated nitrile monomer may be any α,β-ethylenically unsaturated compound having a nitrile group. Examples thereof include, but are not limited to, acrylonitrile; α-halogenoacrylonitriles such as α-chloroacrylonitrile and α-bromoacrylonitrile; α-alkylacrylonitriles such as methacrylonitrile and ethacrylonitrile; and the like. Among these, preferred are acrylonitrile and methacrylonitrile, and particularly preferred is acrylonitrile. These α,β-ethylenically unsaturated nitrile monomers may be used alone or in combination.

The proportion of units of the α,β-ethylenically unsaturated nitrile monomer can be appropriately determined based on the composition of a final hydrogenated nitrile rubber. The proportion thereof in the hydrogenated nitrile rubber is preferably 10 to 60 wt %, more preferably 12 to 58 wt %, further more preferably 16 to 50 wt %. Control of the proportion of the α,β-ethylenically unsaturated nitrile monomer units within the above ranges may result in a hydrogenated nitrile rubber having excellent oil resistance and cold resistance.

Examples of the diene monomer include, but are not limited to, conjugated dienes having 4 or more carbon atoms such as 1,3-butadiene, isoprene, 2,3-dimethyl-1,3-butadiene, and 1,3-pentadiene; and non-conjugated dienes having 5 to 12 carbon atoms such as 1,4-pentadiene and 1,4-hexadiene. Among these, preferred are the conjugated dienes, and more preferred is 1,3-butadiene. These diene monomers may be used alone or in combination.

The proportion of units of the diene monomer can be appropriately determined based on the composition of a final hydrogenated nitrile rubber product. The proportion thereof in the hydrogenated nitrile rubber is preferably 40 to 90 wt %, more preferably 41 to 85 wt %, further more preferably 43 to 80 wt %. Control of the proportion of the diene monomer units within the above ranges may result in a hydrogenated nitrile rubber maintaining excellent heat resistance and chemical-resistant stability and having excellent rubber elasticity.

Examples of the other copolymerizable monomers include α,β-ethylenically unsaturated carboxylic acid ester monomers, α,β-ethylenically unsaturated carboxylic acid monomers, α,β-ethylenically unsaturated polyvalent carboxylate anhydride monomers, aromatic vinyl monomers, fluorine-containing vinyl monomers, copolymerizable antioxidants, and the like.

Examples of the α,β-ethylenically unsaturated carboxylic acid ester monomers include alkyl acrylates and alkyl methacrylates having alkyl groups with 1 to 18 carbon atoms such as methyl acrylate, ethyl acrylate, propyl acrylate, butyl acrylate, n-dodecyl acrylate, methyl methacrylate, and ethyl methacrylate; alkoxyalkyl acrylates and alkoxyalkyl methacrylates having alkoxyalkyl groups with 2 to 12 carbon atoms such as methoxymethyl acrylate and methoxyethyl methacrylate; cyanoalkyl acrylates and cyanoalkyl methacrylates having cyanoalkyl groups with 2 to 12 carbon atoms such as α-cyanoethyl acrylate, β-cyanoethyl acrylate, and cyanobutyl methacrylate; hydroxyalkyl acrylates and hydroxyalkyl methacrylates having hydroxyalkyl groups with 1 to 12 carbon atoms such as 2-hydroxyethyl acrylate, 2-hydroxyethyl methacrylate, and 3-hydroxypropyl acrylate; fluorine-substituted benzyl group-containing acrylic acid esters and fluorine-substituted benzyl group-containing methacrylic acid esters such as fluorobenzyl acrylate and fluorobenzyl methacrylate; fluoroalkyl group-containing acrylic acid esters and fluoroalkyl group-containing methacrylic acid esters such as trifluoroethyl acrylate and tetrafluoropropyl methacrylate; unsaturated polyvalent carboxylic acid polyalkyl esters such as dimethyl maleate, dimethyl fumarate, dimethyl itaconate, and diethyl itaconate; amino group-containing α,β-ethylenically unsaturated carboxylic acid esters such as dimethylaminomethyl acrylate and diethylaminoethyl acrylate; and the like.

Examples of the α,β-ethylenically unsaturated carboxylic acid monomers include α,β-ethylenically unsaturated monocarboxylic acids such as acrylic acid and methacrylic acid; α,β-ethylenically unsaturated polyvalent carboxylic acids such as maleic acid, fumaric acid, and itaconic acid; partial esters of α,β-ethylenically unsaturated polyvalent carboxylic acids such as monoalkyl maleates (e.g., monomethyl maleate, monoethyl maleate, monopropyl maleate, and mono-n-butyl maleate), monocycloalkyl maleates (e.g., monocyclopentyl maleate, monocyclohexyl maleate, and monocycloheptyl maleate), monoalkylcycloalkyl maleates (e.g., monomethylcyclopentyl maleate and monoethylcyclohexyl maleate), monoalkyl fumarates (e.g., monomethyl fumarate, monoethyl fumarate, monopropyl fumarate, and mono-n-butyl fumarate), monocycloalkyl fumarates (e.g., monocyclopentyl fumarate, monocyclohexyl fumarate, and monocycloheptyl fumarate), monoalkylcycloalkyl fumarates (e.g., monomethylcyclopentyl fumarate and monoethylcyclohexyl fumarate), monoalkyl citraconates (e.g., monomethyl citraconate, monoethyl citraconate, monopropyl citraconate, and mono-n-butyl citraconate), monocycloalkyl citraconates (e.g., monocyclopentyl citraconate, monocyclohexyl citraconate, and monocycloheptyl citraconate), monoalkylcycloalkyl citraconates (e.g., monomethylcyclopentyl citraconate and monoethylcyclohexyl citraconate), monoalkyl itaconates (e.g., monomethyl itaconate, monoethyl itaconate, monopropyl itaconate, and mono-n-butyl itaconate), monocycloalkyl itaconates (e.g., monocyclopentyl itaconate, monocyclohexyl itaconate, and monocycloheptyl itaconate), and monoalkylcycloalkyl itaconates (e.g., monomethylcyclopentyl itaconate and monoethylcyclohexyl itaconate); and the like.

Examples of the α,β-ethylenically unsaturated polyvalent carboxylate anhydride monomers include maleate anhydride and the like.

Examples of the aromatic vinyl monomers include styrene, α-methylstyrene, vinylpyridine, and the like.

Examples of the fluorine-containing vinyl monomers include fluoroethyl vinyl ether, fluoropropyl vinyl ether, o-trifluoromethylstyrene, vinyl pentafluorobenzoate, difluoroethylene, tetrafluoroethylene, and the like.

Examples of the copolymerizable antioxidants include N-(4-anilinophenyl)acrylamide, N-(4-anilinophenyl)methacrylamide, N-(4-anilinophenyl)cinnamamide, N-(4-anilinophenyl)crotonamide, N-phenyl-4-(3-vinylbenzyloxy) aniline, N-phenyl-4-(4-vinylbenzyloxy)aniline, and the like.

Any combination of these other copolymerizable monomers may be used. The proportion of units of the other copolymerizable monomers can be appropriately determined based on the composition of a final hydrogenated nitrile rubber. The proportion thereof in the hydrogenated nitrile rubber is preferably 30 wt % or less, more preferably 20 wt % or less, further more preferably 10 wt % or less.

The nitrile rubber latex used in the first coagulation step in the production method according to the present invention may be obtained by emulsion polymerization of a monomer mixture containing the above monomers. In the emulsion polymerization, an emulsifier, a polymerization initiator, a molecular weight modifier, and other polymerization additives usually used can be used.

Examples of the emulsifier include, but are not limited to, nonionic emulsifiers such as polyoxyethylene alkyl ethers, polyoxyethylene alkyl phenol ethers, polyoxyethylene alkyl esters, and polyoxyethylene sorbitan alkyl esters; anionic emulsifiers such as salts of fatty acids (e.g., myristic acid, palmitic acid, oleic acid, and linolenic acid), salts of alkylbenzene sulfonic acids (e.g., sodium dodecylbenzene sulfonate), salts of higher alcohol sulfuric acid esters, and salts of alkyl sulfosuccinic acids; copolymerizable emulsifiers such as sulfoesters of α,β-unsaturated carboxylic acids, sulfate esters of α,β-unsaturated carboxylic acids, and sulfoalkylaryl ethers; and the like. The amount of the emulsifier to be added is preferably 0.1 to 10 parts by weight, more preferably 0.5 to 5 parts by weight relative to 100 parts by weight of the monomer mixture used in the polymerization.

The polymerization initiator may be any radical initiator. Examples thereof include, but are not limited to, inorganic peroxides such as potassium persulfate, sodium persulfate, ammonium persulfate, potassium perphosphate, and hydrogen peroxide; organic peroxides such as t-butyl peroxide, cumene hydroperoxide, p-menthane hydroperoxide, di-t-butyl peroxide, t-butylcumyl peroxide, acetyl peroxide, isobutyryl peroxide, octanoyl peroxide, dibenzoyl peroxide, 3,5,5-trimethylhexanoyl peroxide, and t-butyl peroxyisobutyrate; azo compounds such as azobisisobutyronitrile, azobis-2,4-dimethylvaleronitrile, azobiscyclohexane carbonitrile, and methyl azobisisobutyrate; and the like. These polymerization initiators may be used alone or in combination. Preferred polymerization initiators are inorganic and organic peroxides. In the case where a peroxide is used as the polymerization initiator, a combination thereof with a reducing agent such as sodium bisulfite or ferrous sulfate can be used as a redox polymerization initiator. The amount of the polymerization initiator to be added is preferably 0.01 to 2 parts by weight relative to 100 parts by weight of the monomer mixture used in the polymerization.

Although the molecular weight modifier is not particularly limited, mercapto group-containing compounds are preferably used. Examples thereof include mercapto group-containing compounds having 9 to 12 carbon atoms such as 2,2,4,6,6-pentamethyl-4-heptanethiol, 2,4,4,6,6-pentamethyl-2-heptanethiol, 2,3,4,6,6-pentamethyl-2-heptanethiol, and 2,3,4,6,6-pentamethyl-3-heptanethiol; mercapto group-containing compounds having 13 to 16 carbon atoms such as 2,2,4,6,6-pentamethyl-4-octanethiol and 2,2,4,6,6,8,8-heptamethyl-4-nonanethiol; t-dodecyl mercaptan (a mixture of mercapto group-containing compounds having 9 to 16 carbon atoms); and the like. In addition to or instead of these mercapto group-containing compounds, halogenated hydrocarbons (such as carbon tetrachloride, methylene chloride, and methylene bromid), α-methylstyrene dimer, a sulfur-containing compound (such as tetraethyl thiuram disulfide, dipentamethylene thiuram disulfide, and diisopropyl xanthogen disulfide), and the like may be used. These molecular weight modifiers may be used alone or in combination. The amount of the molecular weight modifier to be added is preferably 0.01 to 2 parts by weight, more preferably 0.05 to 1 part by weight relative to 100 parts by weight of the monomer mixture used in the polymerization.

Typically, water is used as a medium in the emulsion polymerization. The amount of water is preferably 80 to 500 parts by weight, more preferably 80 to 300 parts by weight relative to 100 parts by weight of the monomers used in polymerization.

In the emulsion polymerization, polymerization additives such as a stabilizer, a dispersant, a pH adjuster, an oxygen absorbing agent, and a particle size adjuster may be used as needed. Any type of additive can be used in any amount.

The first coagulation step in the production method according to the present invention is a step of adding a halogen atom-free metal salt as a coagulant to the nitrile rubber latex prepared by the method described above to form a nitrile rubber coagulum.

In the production method according to the present invention, the halogen atom-free metal salt is used to coagulate the nitrile rubber latex before hydrogenation. As a result of its use, the production method according to the present invention provides a hydrogenated nitrile rubber which can provide a cross-linked rubber having excellent heat oil resistance. In particular, what is needed for applications with exposure to an oil at high temperature is prevention of degradation of properties (including elongation) even in a harsh test environment where immersion in an oil and subsequent heat aging are repeated (namely, excellent heat oil resistance). The present inventors have conducted intensive studies on the relationship between the heat oil resistance of cross-linked products of rubber and coagulants used in coagulation of nitrile rubber latices, and have found that the use of a halogen atom-free metal salt as a coagulant results in a rubber which can provide a cross-linked product having remarkably enhanced heat oil resistance while the use of a halogen atom-containing metal salt in coagulation results in a rubber which provides a cross-linked product having poor heat oil resistance.

In the production method according to the present invention, a divalent metal salt is used to coagulate a hydrogenated nitrile rubber solution after hydrogenation (the second coagulation step). As a result of its use, the production method according to the present invention provides a hydrogenated nitrile rubber which can provide a cross-linked rubber having excellent adhesion to metals as well as excellent heat oil resistance. For this reason, the production method according to the present invention is preferable for applications where such excellent adhesion to metals is required and, in particular, applications where a rubber is used at high temperature in contact with a metal under exposure to an oil.

The halogen atom-free metal salt may be any metal salt substantially free from halogen atoms. Examples thereof include, but are not limited to, nitrates such as sodium nitrate, potassium nitrate, lithium nitrate, magnesium nitrate, calcium nitrate, zinc nitrate, titanium nitrate, manganese nitrate, iron nitrate, cobalt nitrate, nickel nitrate, aluminum nitrate, and tin nitrate; acetates such as barium acetate, calcium acetate, and zinc acetate; sulfates such as sodium sulfate, potassium sulfate, lithium sulfate, magnesium sulfate, calcium sulfate, zinc sulfate, titanium sulfate, manganese sulfate, iron sulfate, cobalt sulfate, nickel sulfate, aluminum sulfate, and tin sulfate; and the like. These may be used alone or in combination. Among these, preferred are sulfates and more preferred are magnesium sulfate and aluminum sulfate because they are highly effective in improving the heat oil resistance. Particularly preferred is aluminum sulfate because the use of even a small amount thereof allows coagulation to proceed smoothly. Although the halogen atom-free metal salt used in the production method according to the present invention may be any salt substantially free from halogen atoms, it may contain halogen atoms in such amounts (e.g., 100 ppm by weight or less) that they are considered as inevitable impurities.

The amount of the halogen atom-free metal salt used in the first coagulation step in the production method according to the present invention is preferably 0.5 to 20 parts by weight, more preferably 1 to 15 parts by weight, further more preferably 2 to 10 parts by weight relative to 100 parts by weight of the nitrile rubber component in the nitrile rubber latex. By using the halogen atom-free metal salt in an amount within the above ranges, sufficient coagulation can be ensured (in other words, efficient coagulation can be ensured without leaving unsolidified rubber) in the first coagulation step, and a cross-linked rubber having appropriately enhanced heat oil resistance can be obtained.

As a coagulation method in the first coagulation step, although not particularly limited, either of the following methods may be used: a method (a) involving adding the halogen atom-free metal salt as a coagulant, optionally in the form of an aqueous solution, to the nitrile rubber latex, and stirring the resulting mixture; and a method (β) involving preparing an aqueous solution of the halogen atom-free metal salt as a coagulant, adding the nitrile rubber latex to the aqueous solution of the halogen atom-free metal salt, and stirring the resulting mixture. Preferred is the method (β). In this case, in order to ensure sufficient coagulation (in other words, to ensure efficient coagulation without leaving unsolidified rubber), the concentration of the halogen atom-free metal salt in the aqueous solution of the halogen atom-free metal salt is preferably 0.05 to 15 wt %, more preferably 0.05 to 12 wt %, further more preferably, 0.1 to 10 wt %, yet further more preferably 0.2 to 7 wt %.

The coagulation temperature in the first coagulation step in the production method according to the present invention is preferably 10 to 80° C., more preferably 20 to 60° C., although not particularly limited thereto.

In the first coagulation step in the production method according to the present invention, the coagulum famed by the coagulation process may be optionally washed with water, filtered, and dried to afford a solid nitrile rubber.

<Solution Preparation Step>

The solution preparation step in the production method according to the present invention is a step of dissolving the nitrile rubber obtained through the first coagulation step in an organic solvent to prepare a nitrile rubber solution.

The organic solvent for preparing the nitrile rubber solution may be any solvent that dissolves the nitrile rubber. Examples thereof include, but are not limited to, benzene, chlorobenzene, toluene, xylene, hexane, cyclohexane, tetrahydrofuran, methyl ethyl ketone, ethyl acetate, cyclohexanone, acetone, and the like. Among these, acetone is preferred because it can dissolve the nitrile rubber well and allows the hydrogenation reaction in the hydrogenation step described later to successfully proceed.

The concentration of the nitrile rubber component in the nitrile rubber solution prepared in the solution preparation step in the present invention is preferably 1 to 70 wt %, more preferably 1 to 40 wt %, particularly preferably 2 to 20 wt %, although not particularly limited thereto. Control of the concentration of the nitrile rubber component in the nitrile rubber solution within the above ranges enables the hydrogenation reaction in the hydrogenation step described later to proceed effectively.

<Hydrogenation Step>

The hydrogenation step in the production method according to the present invention is a step of subjecting the nitrile rubber solution prepared through the solution preparation step to a hydrogenation reaction to afford a hydrogenated nitrile rubber solution.

Any conventionally known selective hydrogenation catalyst can be used as a hydrogenation catalyst in the hydrogenation reaction. As a platinum group element-containing catalyst, any catalyst containing a platinum group element (i.e., ruthenium, rhodium, palladium, osmium, iridium, or platinum) may be used without limitation. In terms of catalytic activity and availability, palladium compounds and rhodium compounds are preferred, and palladium compounds are more preferred. Two or more platinum group element compounds may be used in combination. In this case, it is preferable that a palladium compound be used as the main catalytic component.

As the palladium compounds, divalent or tetravalent palladium compounds are typically used in the form of salts or complex salts. Examples of the palladium compounds include palladium acetate, palladium cyanide, palladium fluoride, palladium chloride, palladium bromide, palladium iodide, palladium nitrate, palladium sulfate, palladium oxide, palladium hydroxide, dichloro(cyclooctadiene) palladium, dichloro(norbornadiene) palladium, dichlorobis(triphenylphosphine) palladium, sodium tetrachloropalladate, ammonium hexachloropalladate, potassium tetracyanopalladate, and the like. Among these palladium compounds, palladium acetate, palladium nitrate, palladium sulfate, palladium chloride, sodium tetrachloropalladate, and ammonium hexachloropalladate are preferable, and palladium acetate, palladium nitrate, and palladium chloride are more preferable.

The palladium compounds listed above may be used as they are, or may be used as supported catalysts supported on carriers. As carriers for forming such supported catalysts, those generally used as carriers for metal catalysts may be used. Specifically, inorganic compounds containing carbon, silicon, aluminum, magnesium, or the like are preferred. Specific examples thereof include known catalyst carriers such as activated carbon, activated clay, talc, clay, alumina gel, silica, diatomaceous earth, and synthetic zeolite.

The temperature during the hydrogenation reaction is typically 0 to 200° C., preferably 5 to 150° C., more preferably 10 to 100° C. By controlling the temperature during the hydrogenation reaction within the above ranges, side reactions can be suppressed and a sufficient reaction rate can be ensured.

The pressure of hydrogen during the hydrogenation reaction is typically 0.1 to 20 MPa, preferably 0.1 to 15 MPa, more preferably 0.1 to 10 MPa. The reaction time is typically 30 minutes to 50 hours, although not particularly limited thereto. It is preferable that the reaction system be pressurized with hydrogen gas after purging the reaction system first with nitrogen and then with hydrogen.

<Second Coagulation Step>

The second coagulation step in the production method according to the present invention is a step of adding a divalent metal salt as a coagulant to the hydrogenated nitrile rubber solution prepared through the hydrogenation step to form a hydrogenated nitrile rubber coagulum.

In the production method according to the present invention, the halogen atom-free metal salt is used to coagulate the nitrile rubber latex in the first coagulation step described above, and the divalent metal salt is used to solidify the hydrogenated nitrile rubber from the hydrogenated nitrile rubber solution after the hydrogenation reaction. As a result of their use, the production method according to the present invention provides a hydrogenated nitrile rubber which can provide a cross-linked rubber having excellent adhesion to metals as well as excellent heat oil resistance. In addition, the divalent metal salt used to solidify the hydrogenated nitrile rubber from the hydrogenated nitrile rubber solution after the hydrogenation reaction forms a salt with the emulsifier added in the preparation of the nitrile rubber during coagulation. Consequently, the emulsifier can also be removed, which prevents defects due to residual emulsifier in the resulting hydrogenated nitrile rubber, such as incorporated white impurities and clogging of a filter during coagulation.

The divalent metal salt may be any metal salt that is ionized to generate a divalent metal ion. Examples thereof include, but are not limited to, divalent metal chlorides such as barium chloride, calcium chloride, magnesium chloride, and zinc chloride; nitrates of divalent metals such as barium nitrate, calcium nitrate, magnesium nitrate, and zinc nitrate; acetates of divalent metals such as barium acetate, calcium acetate, magnesium acetate, and zinc acetate; sulfates of divalent metals such as barium sulfate, calcium sulfate, and magnesium sulfate; and the like. These may be used alone or in combination. Among these, preferred are chlorides of divalent metals, more preferred are calcium chloride and magnesium chloride, and particularly preferred is calcium chloride from the viewpoint of providing a cross-linked rubber having further enhanced adhesion to metals.

The amount of the divalent metal salt used in the second coagulation step in the production method according to the present invention is preferably 0.01 to 0.5 parts by weight, more preferably 0.02 to 0.4 parts by weight, further more preferably 0.04 to 0.2 parts by weight relative to 100 parts by weight of the hydrogenated nitrile rubber component in the hydrogenated nitrile rubber solution. By using the divalent metal salt in an amount within the above ranges, sufficient coagulation can be ensured (in other words, efficient coagulation can be ensured without leaving unsolidified rubber) in the second coagulation step, and a cross-linked rubber having appropriately enhanced adhesion to metals can be obtained.

As a coagulation method in the second coagulation step, although not particularly limited, either of the following methods may be used: a method ($\gamma$) involving adding the divalent metal salt as a coagulant, optionally in the form of an aqueous solution, to the hydrogenated nitrile rubber solution and stirring the resulting mixture; and a method ($\delta$) involving preparing an aqueous solution of the divalent metal salt as a coagulant, adding the hydrogenated nitrile rubber solution to the aqueous solution of the divalent metal salt, and stirring the resulting mixture. Preferred is the method ($\delta$). In this case, in order to ensure sufficient coagulation (in other words, to ensure efficient coagulation without leaving unsolidified rubber), the concentration of the divalent metal salt in the aqueous solution of the divalent metal salt is 0.003 to 20 wt %, more preferably 0.005 to 17 wt %, further more preferably 0.01 to 15 wt %, particularly preferably 0.01 to 5 wt %.

The coagulation temperature in the second coagulation step in the production method according to the present invention is preferably 20 to 95° C., more preferably 30 to 90° C., although not particularly limited thereto.

In the second coagulation step in the production method according to the present invention, the coagulum famed by the coagulation process may be optionally washed with water, filtered, and dried to afford a solid hydrogenated nitrile rubber.

The hydrogenated nitrile rubber produced by the production method according to the present invention has an iodine value of 120 or less, preferably 80 or less, more preferably 60 or less. The lower limit of the iodine value is typically 3 or more, although not particularly limited thereto. Too high an iodine value may result in a cross-linked rubber having poor heat resistance.

The hydrogenated nitrile rubber produced by the production method according to the present invention has a polymer Mooney viscosity (ML1+4, 100° C.) of preferably 10 to 200, more preferably 15 to 150, further more preferably 15 to 100, particularly preferably 30 to 90. A rubber with too low a polymer Mooney viscosity may provide a cross-linked rubber having reduced mechanical properties. On the other hand, a rubber with too high a polymer Mooney viscosity may provide a cross-linkable rubber composition with reduced processability when such a rubber is combined with a cross-linking agent.

<Cross-Linkable Rubber Composition>

The cross-linkable rubber composition according to the present invention contains a hydrogenated nitrile rubber obtained by the production method according to the present invention and a cross-linking agent.

The cross-linking agent used in the present invention may be any cross-linking agent capable of cross-linking the hydrogenated nitrile rubber obtained by the production method according to the present invention. Preferred examples thereof include, but are not limited to, sulfur cross-linking agents, organic peroxide cross-linking agents, and the like.

Examples of the sulfur cross-linking agents include sulfur products such as powdered sulfur and precipitated sulfur; organic sulfur compounds such as 4,4'-dithiomorpholine, tetramethylthiuram disulfide, tetraethylthiuram disulfide, and polysulfide polymers; and the like. Such a sulfur cross-linking agent is used in an amount of preferably 0.1 to 5 parts by weight, more preferably 0.2 to 4.5 parts by weight, further more preferably 0.3 to 4 parts by weight relative to 100 parts by weight of the hydrogenated nitrile rubber. The use of the sulfur-cross-linking agent in an amount within the above ranges may result in a cross-linked rubber having further enhanced tensile strength and elongation.

Any organic peroxide cross-linking agent used as a cross-linking agent in the field of rubber industry can be used, and examples thereof include, but are not limited to, dialkyl peroxides, diacyl peroxides, peroxy esters, and the like. Preferred are dialkyl peroxides and the like. Examples of dialkyl peroxides include dicumyl peroxide, di-t-butyl peroxide, 2,5-dimethyl-2,5-di(t-butylperoxy)-3-hexyne, 2,5-dimethyl-2,5-di(t-butylperoxy)-3-hexane, 1,3-bis(t-butylperoxyisopropyl)benzene, and the like. Examples of diacyl peroxides include benzoyl peroxide, isobutyryl peroxide, and the like. Examples of peroxy esters include 2,5-dimethyl-2,5-bis(benzoylperoxy)hexane, t-butylperoxyisopropyl carbonate, and the like.

Such an organic peroxide cross-linking agent is used in an amount of preferably 1 to 16 parts by weight, more preferably 1 to 14 parts by weight, further more preferably 1 to 12 parts by weight relative to 100 parts by weight of the hydrogenated nitrile rubber. The use of the organic peroxide cross-linking agent in an amount within the above ranges may result in a cross-linked rubber having further enhanced tensile strength and elongation.

In the case where a sulfur cross-linking agent is used as the cross-linking agent, the sulfur cross-linking agent may be used in combination with a cross-linking aid such as sulfur oxide, a guanidine-based vulcanization accelerator, a thiazole-based vulcanization accelerator, a thiuram-based vulcanization accelerator, or dithiocarbamine-based vulcanization accelerator.

In the case where an organic peroxide cross-linking agent is used as the cross-linking agent, the organic peroxide cross-linking agent may be used in combination with a cross-linking aid such as triallyl cyanurate, trimethylolpropane trimethacrylate, or N,N'-m-phenylene bismaleimide.

These cross-linking aids may be used alone or in combination, and may be dispersed in clay, calcium carbonate, silica, or the like to improve the processability of the rubber composition. The amount of the cross-linking aid to be used is not particularly limited, and may be determined according to factors such as the intended use of the cross-linked rubber, required performance, the type of cross-linking agent, and the type of cross-linking aid.

Besides the hydrogenated nitrile rubber, the cross-linking agent, and the optional cross-linking aid and vulcanization accelerator, the cross-linkable rubber composition according to the present invention may further contain additives generally used in the rubber field, such as reinforcing agents (e.g., carbon black and silica), fillers (e.g., calcium carbonate, talc, and clay), metal oxides (e.g., zinc oxide and magnesium oxide), α,β-ethylenically unsaturated carboxylic acid metals salts (e.g., zinc methacrylate and zinc acrylate), co-agents, cross-linking aids, cross-linking retarders, antioxidants, light stabilizers, scorching preventing agents (e.g., primary amines), activating agents (e.g., diethylene glycol), coupling agents, plasticizers, processing aids, greases, adhesives, lubricants, flame retardants, antifungal agents, acid acceptors, antistatic agents, pigments, and foaming agents. These additives can be added in any amounts according to the purpose of addition within the ranges not impairing the object and effects of the present invention.

Examples of carbon black include furnace black, acetylene black, thermal black, channel black, austin black, graphite, and the like. These can be used alone or in combination.

Examples of silica include natural silicas such as quartz powder and silica stone powder; synthetic silicas such as silicic anhydride (e.g., silica gel and aerosil) and hydrous silicic acid; and the like. Among these, preferred are synthetic silicas. These silicas may be surface-treated with a coupling agent or the like.

Examples of plasticizers include, but are not limited to, trimellitic acid plasticizers, pyromellitic acid plasticizers, ether ester plasticizers, polyester plasticizers, phthalic acid plasticizers, adipic acid ester plasticizers, adipic acid ether ester plasticizers, phosphoric acid ester plasticizers, sebacic acid ester plasticizers, alkylsulfonic acid ester compound plasticizers, epoxidated vegetable oil plasticizers, and the like. Specific examples thereof include tri-2-ethylhexyl trimellitate, isononyl trimellitate, trimellitic acid mixed linear alkyl esters, dipentaerythritol esters, 2-ethylhexyl pyromellitate, polyether esters (molecular weight: about 300 to 5000), bis[2-(2-butoxyethoxy)ethyl] adipate, dioctyl adipate, di(butoxyethoxy)ethyl adipate, adipic acid polyester (molecular weight: about 300 to 5000), dioctyl phthalate, diisononyl phthalate, dibutyl phthalate, tricresyl phosphate, dibutyl sebacate, phenyl alkyl sulfonates, epoxidized soybean oil, diheptanoate, di-2-ethylhexanoate, didecanoate, and the like. These can be used alone or in combination.

The cross-linkable rubber composition according to the present invention may further contain a rubber other than the hydrogenated nitrile rubber obtained by the production method according to the present invention.

Examples of such a rubber include acrylic rubber, ethylene-acrylic acid copolymer rubber, styrene-butadiene copolymer rubber, polybutadiene rubber, ethylene-propylene copolymer rubber, ethylene-propylene-diene ternary copolymer rubber, epichlorohydrin rubber, fluorocarbon rubber, urethane rubber, chloroprene rubber, silicone rubber, natural rubber, polyisoprene rubber, and the like.

In the case where a rubber other than the hydrogenated nitrile rubber obtained by the production method according to the present invention is added, the amount thereof in the cross-linkable rubber composition is preferably 30 parts by weight or less, more preferably 20 parts by weight or less, further more preferably 10 parts by weight or less relative to 100 parts by weight of the hydrogenated nitrile rubber obtained by the production method according to the present invention.

The cross-linkable rubber composition according to the present invention is prepared by mixing the above ingredients preferably in a non-aqueous system. Although any method can be used to prepare the cross-linkable rubber composition according to the present invention, the cross-linkable rubber composition is typically prepared as follows: The ingredients other than the cross-linking agent and thermally unstable ingredients are primarily kneaded with a mixer such as a Banbury mixer, an internal mixer, or a kneader. The kneaded mixture is transferred into an open roll mill or the like, and is combined with the cross-linking agent and the thermally unstable ingredients. The resulting mixture is then secondarily kneaded. The primary kneading is performed at a temperature of typically 10 to 200° C., preferably 30 to 180° C. for 1 minute to 1 hour, preferably 1 minute to 30 minutes. The secondary kneading is performed at a temperature of typically 10 to 90° C., preferably 20 to 60° C. for 1 minute to 1 hour, preferably 1 minute to 30 minutes.

<Cross-Linked Rubber>

The cross-linked rubber according to the present invention is prepared by cross-linking the cross-linkable rubber composition according to the present invention described above.

The cross-linked rubber according to the present invention can be prepared as follows: The cross-linkable rubber composition according to the present invention is shaped using a shaping machine having a desired shape, such as an extruder, an injection molding machine, a compressor, or a roll, and is subjected to a cross-linking reaction by heating to provide a cross-linked product having a fixed shape. In this case, the composition may be cross-linked after shaping, or may be shaped and cross-linked at the same time. The shaping temperature is typically 10 to 200° C., preferably 25 to 120° C. The cross-linking temperature is typically 100 to 200° C., preferably 130 to 190° C. The cross-linking time is typically 1 minute to 24 hours, preferably 2 minutes to 1 hour.

Depending on the shape, the size, and the like thereof, the inside of the cross-linked rubber may not be sufficiently cross-linked, even when the surface thereof is cross-linked. To avoid this, the cross-linked rubber may be further heated for secondary cross-linking.

As a heating method, a general method for cross-linking rubber, such as press heating, steam heating, oven heating, or hot air heating, can be appropriately selected.

The cross-linked rubber according to the present invention thus obtained is produced using a hydrogenated nitrile rubber obtained by the production method according to the present invention, and therefore has high tensile strength and elongation, excellent heat oil resistance, and excellent adhesion to metals.

Owing to these properties, the cross-linked rubber according to the present invention can be used in a variety of applications including a variety of seal members such as O-rings, packings, diaphragms, oil seals, shaft seals, bearing seals, wellhead seals, shock absorber seals, air compressor seals, seals for sealing Freon, fluorohydrocarbons, or carbon dioxide used in cooling apparatuses for air conditioners and compressors for refrigerators of air-conditioning systems, seals for sealing supercritical carbon dioxide or subcritical carbon dioxide used as washing media for precision cleaning, seals for roller devices (such as roller bearings, automotive hub units, automotive water pumps, linear guide devices, and ball screws), valves and valve seats, blow out preventers (BOPs), and bladders; a variety of gaskets such as an intake manifold gasket attached to a joint between an intake manifold and a cylinder head, a cylinder head gasket attached to a joint between a cylinder block and a cylinder head, a rocker cover gasket attached to a joint between a rocker cover and a cylinder head, an oil pan gasket attached to a joint between an oil pan and a cylinder block or a transmission case, a gasket for fuel cell separators attached between a pair of housings which sandwich a unit cell including a positive electrode, an electrolyte plate, and a negative electrode, and a gasket for top covers for hard disk drives; a variety of rolls such as printing rolls, ironmaking rolls, papermaking rolls, industrial rolls, and office equipment rolls; a variety of belts such as flat belts (such as film core flat belts, cord flat belts, laminated flat belts, and monolithic flat belts), V-belts (such as wrapped V-belts and low edge V-belts), V-ribbed belts (such as single V-ribbed belts, double V-ribbed belts, wrapped V-ribbed belt, rubber-backed V-ribbed belts, and top cog V-ribbed belts), CVT use belts, timing belts, toothed belts, and conveyor belts; a variety of hoses such as fuel hoses, turbo air hoses, oil hoses, radiator hoses, heater hoses, water hoses, vacuum brake hoses, control hoses, air-conditioner hoses, brake hoses, power steering hoses, air hoses, marine hoses, risers, and flow lines; a variety of boots such as CVJ boots, propeller shaft boots, constant velocity joint boots, and rack and pinion boots; damping rubber parts such as cushion materials, dynamic dampers, rubber couplings, air springs, vibration insulators, and clutch facing materials; and dust covers, automotive interior members, friction materials, tires, covered cables, shoe soles, electromagnetic wave shields, binders such as binders for flexible printed circuit boards, and fuel cell separators, as well as applications in the field of electronics. In particular, the cross-linked rubber according to the present invention, because of its excellent heat oil resistance and excellent adhesion to metals, can be used in an environment where it is exposed to high temperature and an oil, and can be particularly suitably used in belt applications which require excellent heat oil resistance and seal applications which require adhesion to metals in an environment where the cross-linked rubber is exposed to high temperature and an oil.

EXAMPLES

The present invention is hereinafter illustrated in specific detail with reference to Examples and Comparative Examples. In the following examples, the term "part(s)" is on a weight basis unless otherwise indicated. Tests and evaluations were performed according to the following methods.

<Original State Physical Properties (Tensile Strength and Elongation)>

A cross-linkable rubber composition was placed in a mold having a length of 15 cm, a width of 15 cm, and a depth of 0.2 cm. The cross-linkable rubber composition was press molded into a sheet-shaped cross-linked product at 170° C. for 20 minutes under pressure. The cross-linked product was transferred to a gear oven and was secondarily cross-linked at 170° C. for 4 hours. Thus, a sheet-shaped cross-linked rubber was prepared. A test piece was punched out from the resulting cross-linked rubber with a JIS #3 dumbbell. The test piece was measured according to JIS K 6251 to determine the tensile strength and the elongation of the cross-linked rubber.

<Heat Oil Resistance>

A sheet-shaped cross-linked rubber was prepared in the same manner as in the evaluation of the original state physical properties described above, and a test piece was punched out from the resulting cross-linked rubber with a JIS #3 dumbbell. The test piece was subjected to an in-oil treatment in which the test piece prepared was immersed in Fuel C (a mixture of isooctane and toluene (volume ratio=50:50)) controlled to 40° C. as a test fuel oil for 168 hours according to JIS K 6258. Subsequently, the test piece after the in-oil treatment was subjected to an air oven aging treatment in which the test piece was held in a gear oven at 150° C. for 168 hours according to JIS K 6257. These treatments (the in-oil treatment and the air oven aging treatment) were repeated 5 times.

The test piece subjected to repetition of the in-oil treatment and the air oven aging treatment 5 times (the test piece after the heat oil resistance test) was measured for elongation according to JIS K 6251. The result of the measurement and the elongation in the original state measured above were used to determine the change in elongation based on the following equation. A smaller absolute value of the change in elongation is regarded as indicating better heat oil resistance.

Change (%) in elongation after heat oil resistance test={((elongation after heat oil resistance test)−(elongation in original state))/(elongation in original state)}×100

<Adhesion to Metal>

A laminate sample was prepared using a cross-linkable rubber composition as follows.

First, a 3 mm×25 mm×60 mm metal plate (JIS G 3141 SPCCSD cold-rolled steel sheet) was prepared. The surface of the metal plate was roughened with a 320 grit sandpaper. The roughened surface of the metal plate was washed with toluene and acetone. Then, an adhesive (Chemlok 201, phenol resin adhesive, available from LORD Corporation) was applied to a 25 mm×30 mm central region of the roughened surface of the metal plate, was air dried by standing for 30 minutes, and then was subjected to a baking treatment in which the metal plate was heated in an oven at 150° C. for 20 minutes. Thus, an adhesive layer was famed over the 25 mm×30 mm region of the surface of the metal plate.

Subsequently, the cross-linkable rubber composition was cut into a sheet-shaped cross-linkable rubber composition sample having a size of 2.5 mm×25 mm×125 mm, and the sheet-shaped cross-linkable rubber composition sample was placed on the surface of the metal plate on which the adhesive layer is famed. Thus, a non-cross-linked laminate was prepared. The non-cross-linked laminate was then placed in a 5 mm×25 mm×125 mm mold, and was compressed under heat at a pressure of 10 MPa at a temperature of 170° C. for 20 minutes using a press shaping machine (in order to ensure sufficient compression force, the compression under heat was performed in the state where in addition to the above sheet, a cross-linkable rubber composition sheet was appropriately laid in the mold in such a manner that the mold was filled up). Thus, the cross-linking reaction of the cross-linkable rubber composition was allowed to proceed. Consequently, a laminate sample for the metal adhesion test (the contact area between the rubber and the metal plate was 25 mm×60 mm, and the area of adhesion between the rubber and the metal plate through the adhesive layer was 25 mm×30 mm) was prepared.

A 90° peeling test was performed according to JIS K 6256-2:2011 using the laminate sample for the metal adhesion test thus prepared. The sample was determined for 90° peel strength and ratio of peeling/damage, which were then used to evaluate metal adhesion. Higher values of the 90° peel strength and the ratio of peeling/damage (which is the ratio by area of a portion where the rubber was damaged in the area of adhesion through the adhesive layer) were preferable. In Examples herein, the 90° peel strength is preferably 8 N/mm or more and the ratio of peeling/damage (which is rounded to the nearest 10%) is preferably 80% or more.

Synthesis Example 1, Production of Nitrile Rubber Latex (L1)

Into a reactor, 200 parts of deionized water and 0.2 parts of sodium carbonate were placed, and the sodium carbonate was dissolved. Thereafter, 2.25 parts of a potassium fatty acid soap (the potassium salt of a fatty acid) was added thereto to prepare a soap aqueous solution. The resulting soap aqueous solution was combined with 38 parts of acrylonitrile and 0.5 parts of t-dodecyl mercaptan (molecular weight modifier) in the stated order. The air inside the reactor was replaced with nitrogen three times, and then 62 parts of 1,3-butadiene was added. Subsequently, the inside of the reactor was maintained at 5° C., and 0.1 parts of cumene hydroperoxide (polymerization initiator) and appropriate amounts of a reducing agent and a chelating agent were added to initiate polymerization. Once the polymerization conversion ratio reached 90%, 0.1 parts of a 10 wt % aqueous solution of hydroquinone (polymerization terminator) was added to terminate the polymerization. The resulting polymer solution was then stirred at 30° C. for 3 hours, and unreacted 1,3-butadiene was removed. The polymer solution was warmed to 50° C., and was combined with a 2.5 wt % aqueous solution of potassium hydroxide in an amount corresponding to 0.5 parts by weight of potassium hydroxide relative to 100 parts by weight of the copolymer in the polymer solution. The resulting mixture was stirred for 3 hours, and was concentrated in vacuo using a rotary evaporator at a water temperature of 60° C. to afford a nitrile rubber latex (L1).

Synthesis Example 2, Production of Nitrile Rubber Latex (L2)

To a reactor, 200 parts of deionized water and 0.2 parts of sodium carbonate were placed, and the sodium carbonate was dissolved. Thereafter, 2.25 parts of a potassium fatty acid soap (the potassium salt of a fatty acid) was added thereto to prepare a soap aqueous solution. The resulting soap aqueous solution was combined with 9 parts of acrylonitrile, 39 parts of n-butyl acrylate, and 0.5 parts of t-dodecyl mercaptan (molecular weight modifier) in the stated order. The air inside the reactor was replaced with nitrogen three times, and then 32 parts of 1,3-butadiene was added. Subsequently, the inside of the reactor was maintained at 5° C., and 0.1 parts of cumene hydroperoxide (polymerization initiator) and appropriate amounts of a reducing agent and a chelating agent were added to initiate polymerization. When the polymerization conversion ratio reached 60%, 10 parts of acrylonitrile and 10 parts of 1,3-butadiene were added, and when the polymerization conversion ratio reached 85%, 0.1 parts of a 10 wt % aqueous solution of hydroquinone (polymerization terminator) was added to terminate the polymerization. The resulting polymer solution was then stirred at 30° C. for 3 hours, and unreacted 1,3-butadiene was removed. The polymer solution was wailed to 50° C., and was combined with a 2.5 wt % aqueous solution of potassium hydroxide in an amount corresponding to 0.5 parts by weight of potassium hydroxide relative to 100 parts by weight of the copolymer in the polymer solution. The resulting mixture was stirred for 3 hours, and was concentrated in vacuo using a rotary evaporator at a water temperature of 60° C. to afford a nitrile rubber latex (L2).

Example 1

For 100 parts by weight of the nitrile rubber component in the nitrile rubber latex (L1) prepared in Synthesis Example 1, 1500 parts of an aluminum sulfate aqueous solution (C1-1) containing 3 parts of aluminum sulfate was prepared. The concentration of aluminum sulfate was 0.2 wt %. The 0.2 wt % aluminum sulfate aqueous solution (C1-1) prepared was warmed to 30° C. The nitrile rubber latex (L1) in an amount corresponding to 100 parts of the nitrile rubber component was then added to 1500 parts (3 parts in terms of aluminum sulfate) of the aluminum sulfate aqueous solution (C1-1) warmed to 30° C., and the resulting mixture was stirred at 30° C. to cause coagulation. The famed coagulum was filtered while being washed with water, and then was vacuum dried at 60° C. for 12 hours. As a result, a solid nitrile rubber (N1) was obtained.

Next, the nitrile rubber (N1) thus obtained was dissolved to give a concentration of 12 wt % in acetone. Thus, an acetone solution (S1-1) of the nitrile rubber was prepared. The acetone solution (S1-1) of the nitrile rubber was placed in an autoclave, and 500 ppm by weight of a palladium-silica catalyst was added relative to 100 wt % of the nitrile rubber (N1). The resulting mixture was then subjected to a hydrogenation reaction at 25° C. at a hydrogen pressure of 3.0 MPa for 6 hours, thereby providing an acetone solution (S2-1) of a hydrogenated nitrile rubber.

Next, for 100 parts by weight of the hydrogenated nitrile rubber component in the acetone solution (S2-1) of a hydrogenated nitrile rubber thus prepared, 500 parts of a calcium chloride aqueous solution (C2-1) containing 0.1 parts of calcium chloride was prepared. The concentration of calcium chloride was 0.02 wt %. The 0.02 wt % calcium chloride aqueous solution (C2-1) prepared was warmed to 80° C. The acetone solution (S2-1) of a hydrogenated nitrile rubber in an amount corresponding to 100 parts of the hydrogenated nitrile rubber component was then added to 500 parts (0.1 parts in terms of calcium chloride) of the calcium chloride aqueous solution (C2-1) warmed to 80° C., and the resulting mixture was stirred at 80° C. to cause coagulation. The famed coagulum was filtered while being washed with water, and then was vacuum dried at 60° C. for 12 hours. As a result, a solid hydrogenated nitrile rubber (H1) was obtained. The resulting hydrogenated nitrile rubber (H1) had a composition consisting of 37 wt % of acrylonitrile units and 63 wt % of 1,3-butadiene units (including saturated units), and had an iodine value of 25 (which was measured according to JIS K 6235. The same applies to the following examples and comparative examples).

50 parts of FEF carbon (product name "SEAST SO", available from Tokai Carbon Co., Ltd., carbon black), 5 parts of an adipic acid-ether-ester plasticizer (product name, "Adekacizer RS-107", available from ADEKA CORPORATION, di(butoxyethoxyethyl) adipate), 1.5 parts of 4,4'-di-(α,α-dimethylbenzyl)diphenylamine (product name "Noclac CD", available from Ouchi-Shinko Chemical Industrial Co., Ltd., antioxidant), 1.5 parts of the zinc salt of 2-mercaptobenzimidazole (product name "Noclac MBZ", available from Ouchi-Shinko Chemical Industrial Co., Ltd., antioxidant), 1 part of steric acid, 5 parts of zinc oxide (Zinc oxide #1, Seido Chemical Industry Co., Ltd.), and 6 parts of a 1,3-bis(t-butylperoxyisopropyl)benzene 40% product (product name "Vul Cup 40KE", available from Arkema Inc., organic peroxide cross-linking agent) were added to and kneaded with 100 parts of the hydrogenated nitrile rubber (H1) obtained above using an Banbury mixer. Thus, a cross-linkable rubber composition was prepared.

The original state physical properties (tensile strength and elongation), the heat oil resistance, and the adhesion to metals were measured using the resulting cross-linkable rubber composition according to the methods described above. The results are shown in Table 1.

Example 2

For 100 parts by weight of the nitrile rubber component in the nitrile rubber latex (L1) prepared in Synthesis Example 1, 1000 parts of an aluminum sulfate aqueous solution (C1-2) containing 2 parts of aluminum sulfate was prepared. The concentration of aluminum sulfate was 0.2 wt %. The 0.2 wt % aluminum sulfate aqueous solution (C1-2) prepared was warmed to 30° C. The nitrile rubber latex (L1) in an amount corresponding to 100 parts of the nitrile rubber component was then added to 1000 parts (2 parts in terms of aluminum sulfate) of the aluminum sulfate aqueous solution (C1-2) warmed to 30° C., and the resulting mixture was stirred at 30° C. to cause coagulation. The famed coagulum was filtered while being washed with water, and then was vacuum dried at 60° C. for 12 hours. As a result, a solid nitrile rubber (N2) was obtained.

Next, an acetone solution (S2-2) of a hydrogenated nitrile rubber was prepared by performing preparation of an acetone solution and a hydrogenation reaction in the same manner as in Example 1 using the nitrile rubber (N2) obtained above.

Next, for 100 parts by weight of the hydrogenated nitrile rubber component in the acetone solution (S2-2) of a hydrogenated nitrile rubber prepared above, 500 parts of a magnesium chloride aqueous solution (C2-2) containing 0.05 parts of magnesium chloride was prepared. The concentration of magnesium chloride was 0.01 wt %. The 0.01 wt % magnesium chloride aqueous solution (C2-2) prepared was warmed to 80° C. The acetone solution (S2-2) of a hydrogenated nitrile rubber in an amount corresponding to 100 parts of the hydrogenated nitrile rubber component was then added to 500 parts (0.05 parts in terms of magnesium chloride) of the magnesium chloride aqueous solution (C2-2) warmed to 80° C., and the resulting mixture was stirred at 80° C. to cause coagulation. The famed coagulum was filtered while being washed with water, and then was vacuum dried at 60° C. for 12 hours. As a result, a solid hydrogenated nitrile rubber (H2) was obtained. The resulting hydrogenated nitrile rubber (H2) had a composition consisting of 37 wt % of acrylonitrile units and 63 wt % of 1,3-butadiene units (including saturated units), and had an iodine value of 30.

A cross-linkable rubber composition was prepared in the same manner as in Example 1 except that the hydrogenated nitrile rubber (H2) obtained above was used, and was evaluated in the same manner as above. The results are shown in Table 1.

Example 3

For 100 parts by weight of the nitrile rubber component in the nitrile rubber latex (L1) prepared in Synthesis Example 1, 500 parts of a magnesium sulfate aqueous solution (C1-3) containing 10 parts of magnesium sulfate was prepared. The concentration of magnesium sulfate was 2 wt %. The 2 wt % magnesium sulfate aqueous solution (C1-3) prepared was warmed to 30° C. The nitrile rubber latex (L1) in an amount corresponding to 100 parts of the nitrile rubber component was then added to 500 parts (10 parts in terms of magnesium sulfate) of the magnesium sulfate aqueous solution (C1-3) warmed to 30° C., and the resulting mixture was stirred at 30° C. to cause coagulation. The famed coagulum was filtered while being washed with water, and then was vacuum dried at 60° C. for 12 hours. As a result, a solid nitrile rubber (N3) was obtained.

Next, a solid hydrogenated nitrile rubber (H3) was obtained by performing preparation of an acetone solution, a hydrogenation reaction, and coagulation after the hydrogenation reaction in the same manner as in Example 1 using the nitrile rubber (N3) obtained above. The resulting hydrogenated nitrile rubber (H3) had a composition consisting of 37 wt % of acrylonitrile units and 63 wt % of 1,3-butadiene units (including saturated units), and had an iodine value of 35.

A cross-linkable composition was prepared in the same manner as in Example 1 except that the hydrogenated nitrile rubber (H3) obtained above was used, and was evaluated in the same manner as above. The results are shown in Table 1.

Example 4

A solid hydrogenated nitrile rubber (H4) was obtained by performing preparation of an acetone solution, a hydrogenation reaction, and coagulation after the hydrogenation reaction in the same manner as in Example 1 except that the nitrile rubber latex (L2) prepared in Synthesis Example 2 was used instead of the nitrile rubber latex (L1) prepared in Synthesis Example 1. The resulting hydrogenated nitrile rubber (H4) had a composition consisting of 19 wt % of acrylonitrile units, 34 wt % of n-butyl acrylate units, and 47 wt % of 1,3-butadiene units (including saturated units), and had an iodine value of 30.

Comparative Example 1

For 100 parts by weight of the nitrile rubber component in the nitrile rubber latex (L1) prepared in Synthesis Example 1, 1000 parts of a calcium chloride aqueous solution (C1-5) containing 5 parts of calcium chloride was prepared. The concentration of calcium chloride was 0.5 wt %. The 0.5 wt % calcium chloride aqueous solution (C1-5) prepared was warmed to 30° C. The nitrile rubber latex (L1) in an amount corresponding to 100 parts of the nitrile rubber component was then added to 1000 parts (5 parts in terms of calcium chloride) of the calcium chloride aqueous solution (C1-5) warmed to 30° C., and the resulting mixture was stirred at 30° C. to cause coagulation. The famed coagulum was filtered while being washed with water, and then was vacuum dried at 60° C. for 12 hours. Thus, a solid nitrile rubber (N5) was obtained.

Next, an acetone solution (S2-5) of a hydrogenated nitrile rubber was prepared by performing preparation of an acetone solution and a hydrogenation reaction in the same manner as in Example 1 using the nitrile rubber (N5) obtained above.

Next, the acetone solution (S2-5) of a hydrogenated nitrile rubber prepared above was added to deionized water warmed to 80° C., and the resulting mixture was stirred at 80° C. to cause coagulation. The famed coagulum was filtered while being washed with water, and then was vacuum dried at 60° C. for 12 hours. Thus, a solid hydrogenated nitrile rubber (H5) was obtained. The resulting hydrogenated nitrile rubber (H5) had a composition consisting of 37 wt % of acrylonitrile units and 63 wt % of 1,3-butadiene units (including saturated units), and had an iodine value of 50.

A cross-linkable rubber composition was prepared in the same manner as in Example 1 except that the hydrogenated nitrile rubber (H5) obtained above was used, and was evaluated in the same manner as above. The results are shown in Table 1.

Comparative Example 2

Next, an acetone solution (S2-1) of a hydrogenated nitrile rubber was prepared by performing coagulation of a latex, preparation of an acetone solution, and a hydrogenation reaction in the same manner as in Example 1 using the nitrile rubber latex (L1) and the aluminum sulfate aqueous solution (C1-1).

Next, the acetone solution (S2-1) of the hydrogenated nitrile rubber prepared above was added to deionized water warmed to 80° C., and the resulting mixture was stirred at 80° C. to cause coagulation. The famed coagulum was filtered while being washed with water, and then was vacuum dried at 60° C. for 12 hours. As a result, a solid hydrogenated nitrile rubber (H6) was obtained. The resulting hydrogenated nitrile rubber (H6) had a composition consisting of 37 wt % of acrylonitrile units and 63 wt % of 1,3-butadiene units (including saturated units), and had an iodine value of 26.

A cross-linkable rubber composition was prepared in the same manner as in Example 1 except that the hydrogenated nitrile rubber (H6) obtained above was used, and was evaluated in the same manner as above. The results are shown in Table 1.

Comparative Example 3

For 100 parts by weight of the nitrile rubber component in the nitrile rubber latex (L1) prepared in Synthesis Example 1, 200 parts of a sodium chloride aqueous solution (C1-7) containing 20 parts of sodium chloride was prepared. The concentration of sodium chloride was 10 wt %. The 10 wt % sodium chloride aqueous solution (C1-7) prepared was warmed to 30° C. The nitrile rubber latex (L1) in an amount corresponding to 100 parts of the nitrile rubber component was then added to 200 parts (20 parts in terms of sodium chloride) of the sodium chloride aqueous solution (C1-7) warmed to 30° C., and the resulting mixture was stirred at 30° C. to cause coagulation. The famed coagulum was filtered while being washed with water, and then was vacuum dried at 60° C. for 12 hours. As a result, a solid nitrile rubber (N7) was obtained.

Next, a solid hydrogenated nitrile rubber (H7) was obtained by performing preparation of an acetone solution, a hydrogenation reaction and coagulation after the hydrogenation reaction in the same manner as in Example 1 using the nitrile rubber (N7) obtained above. The resulting hydrogenated nitrile rubber (H7) had a composition consisting of 37 wt % of acrylonitrile units and 63 wt % of 1,3-butadiene units (including saturated units), and had an iodine value of 60.

A cross-linkable rubber composition was prepared in the same manner as in Example 1 except that the hydrogenated nitrile rubber (H7) obtained above was used, and was evaluated in the same manner as above. The results are shown in Table 1.

Comparative Example 4

A solid hydrogenated nitrile rubber (H8) was obtained by performing coagulation of a latex, preparation of an acetone solution, a hydrogenation reaction, and coagulation after the hydrogenation reaction in the same manner as in Comparative Example 2 except that the nitrile rubber latex (L2) prepared in Synthesis Example 2 was used instead of the nitrile rubber latex (L1) prepared in Synthesis Example 1. The resulting hydrogenated nitrile rubber (H8) had a composition consisting of 19 wt % acrylonitrile units, 34 wt % of n-butyl acrylate units, 47 wt % of 1,3-butadiene units (including saturated units), and had an iodine value of 28.

A cross-linkable rubber composition was prepared in the same manner as in Example 1 except that the hydrogenated nitrile rubber (H8) obtained above was used, and was evaluated in the same manner as above. The results are shown in Table 1.

Comparative Example 5

A solid hydrogenated nitrile rubber (H9) was prepared by performing coagulation of a latex, preparation of an acetone solution, a hydrogenation reaction, and coagulation after the hydrogenation reaction in the same manner as in Comparative Example 1 except that the amount of the palladium-silica catalyst used in the hydrogenation reaction was changed to 800 ppm by weight. The resulting hydrogenated nitrile rubber (H9) had a composition consisting of 37 wt % acrylonitrile units and 63 wt % of 1,3-butadiene units (including saturated units), and had an iodine value of 30.

A cross-linkable rubber composition was prepared in the same manner as in Example 1 except that the hydrogenated nitrile rubber (H9) prepared above was used, and was evaluated in the same manner as above. The results are shown in Table 1.

solution after hydrogenation was coagulated using deionized water without using any divalent metal salt, the resulting cross-linked rubbers had a low 90° peel strength, a low ratio of peeling/damage, and poor adhesion to metals, which indicate its poor adhesion to the metal (Comparative Examples 2 and 4).

The invention claimed is:

1. A method for producing a hydrogenated nitrile rubber having an iodine value of 120 or less, the method comprising:
    a first coagulation step of adding a halogen atom-free metal salt as a coagulant to a nitrile rubber latex to form a nitrile rubber coagulum;
    a solution preparation step of dissolving the nitrile rubber coagulum in an organic solvent to prepare a nitrile rubber solution;
    a hydrogenation step of subjecting the nitrile rubber solution to a hydrogenation reaction to afford a hydrogenated nitrile rubber solution; and

TABLE 1

|  |  | Example | | | | Comparative Example | | | | |
| --- | --- | --- | --- | --- | --- | --- | --- | --- | --- | --- |
|  |  | 1 | 2 | 3 | 4 | 1 | 2 | 3 | 4 | 5 |
| Nitrile rubber before hydrogenation |  | (L1) | (L1) | (L1) | (L2) | (L1) | (L1) | (L1) | (L2) | (L1) |
| Coagulation of nitrile rubber latex |  |  |  |  |  |  |  |  |  |  |
| Coagulant used |  | $Al_2(SO_3)_4$ | $Al_2(SO_3)_4$ | $MgSO_4$ | $Al_2(SO_3)_4$ | $CaCl_2$ | $Al_2(SO_3)_4$ | NaCl | $Al_2(SO_3)_4$ | $CaCl_2$ |
| Amount of coagulent used *1) | (Parts) | 3 | 2 | 10 | 3 | 5 | 3 | 20 | 3 | 5 |
| Hydrogenation reaction |  |  |  |  |  |  |  |  |  |  |
| Amount of hydrogenation catalyst used | (ppm by weight) | 500 | 500 | 500 | 500 | 500 | 500 | 500 | 500 | 800 |
| Hydrogen pressure | (MPa) | 3.0 | 3.0 | 3.0 | 3.0 | 3.0 | 3.0 | 3.0 | 3.0 | 3.0 |
| Hydrogenation reaction time | (Hours) | 6 | 6 | 6 | 6 | 6 | 6 | 6 | 6 | 6 |
| Coagulation of hydrogenated nitrile rubber solution |  |  |  |  |  |  |  |  |  |  |
| Coagulation used *2) |  | $CaCl_2$ | $MgCl_2$ | $CaCl_2$ | $CaCl_2$ | — | — | $CaCl_2$ | — | — |
| Amount of coagulant used *1) | (Parts) | 0.1 | 0.05 | 0.1 | 0.1 | — | — | 0.1 | — | — |
| Evaluation of cross-linked rubber |  |  |  |  |  |  |  |  |  |  |
| Tensile strength | (MPa) | 25.5 | 26.5 | 24.0 | 21.6 | 24.0 | 25.0 | 23.5 | 22.0 | 23.5 |
| Elongation | (%) | 430 | 420 | 420 | 270 | 450 | 430 | 410 | 270 | 400 |
| Heat oil restance (change in elongation after heat oil resistance | (%) | −20 | −20 | −30 | −35 | −50 | −20 | −55 | −35 | −45 |
| 90 degree peel strength | (N/mm) | 9.0 | 10.2 | 9.9 | 11.0 | 9.2 | 5.0 | 10.0 | 6.0 | 9.5 |
| Ratio of peeling/damage | (%) | 100 | 100 | 90 | 100 | 90 | 30 | 100 | 40 | 90 |

*1) The amounts of coagulants are expressed relative to 100 parts of the nitrile rubber or the hydrogenated nitrile rubber.
*2) In Comparative Examples 1, 2, 4, and 5, coagulation was performed using deionized water (without any coagulant).

As seen in Table 1, in the examples where the nitrile rubber latex before hydrogenation was coagulated using the halogen atom-free metal salt and the hydrogenated nitrile rubber solution after hydrogenation was coagulated using the divalent metal salt, the resulting cross-linked rubbers had higher tensile strength and elongation, excellent heat oil resistance, and excellent adhesion to metals (Examples 1 to 4).

In contrast, in the examples where the nitrile rubber latex before hydrogenation was coagulated using the halogen atom-containing metal salt, the resulting cross-linked rubbers had poor heat oil resistance (Comparative Examples 1, 3, and 5).

Additionally, in the examples where the nitrile rubber latex before hydrogenation was coagulated using the halogen atom-free metal salt and the hydrogenated nitrile rubber a second coagulation step of adding a divalent metal salt as a coagulant to the hydrogenated nitrile rubber solution to form a hydrogenated nitrile rubber coagulum.

2. The method for producing a hydrogenated nitrile rubber according to claim 1,
    wherein the halogen atom-free metal salt is a metal sulfate.

3. The method for producing a hydrogenated nitrile rubber according to claim 2,
    wherein the halogen atom-free metal salt is magnesium sulfate or aluminum sulfate.

4. The method for producing a hydrogenated nitrile rubber according to claim 1,
    wherein the divalent metal salt is a divalent metal chloride.

5. The method for producing a hydrogenated nitrile rubber according to claim 4, wherein the divalent metal salt is calcium chloride or magnesium chloride.

6. The method for producing a hydrogenated nitrile rubber according to claim 1,
wherein the amount of the halogen atom-free metal salt used in the first coagulation step is 0.5 to 20 parts by weight relative to 100 parts by weight of the nitrile rubber component in the nitrile rubber latex, and
the amount of the divalent metal salt used in the second coagulation step is 0.01 to 0.5 parts by weight relative to 100 parts by weight of the hydrogenated nitrile rubber component in the hydrogenated nitrile rubber solution.

7. The method for producing a hydrogenated nitrile rubber according to claim 1,
the first coagulation step includes adding the nitrile rubber latex to an aqueous solution of the halogen atom-free metal salt, and stirring the resulting mixture to cause coagulation.

8. The method for producing a hydrogenated nitrile rubber according to claim 1,
the second coagulation step includes adding the hydrogenated nitrile rubber solution to an aqueous solution of the divalent metal salt, and stirring the resulting mixture to cause coagulation.

9. A method for producing a cross-linkable rubber composition, comprising the step of:
adding a cross-linking agent to a hydrogenated nitrile rubber produced by the production method according to claim 1.

10. A method for producing a cross-linked rubber, comprising the step of:
cross-linking a cross-linkable rubber composition produced by the production method according to claim 9.

* * * * *